United States Patent
Hou

(10) Patent No.: US 8,001,691 B2
(45) Date of Patent: Aug. 23, 2011

(54) METHOD FOR MANUFACTURING HYDRODYNAMIC BEARING AND SHAFT

(75) Inventor: Chuen-Shu Hou, Taipei Hsien (TW)

(73) Assignee: Foxconn Technology Co., Ltd., Tu-Cheng, New Taipei (TW)

( * ) Notice: Subject to any disclaimer, the term of this patent is extended or adjusted under 35 U.S.C. 154(b) by 1194 days.

(21) Appl. No.: 11/687,126

(22) Filed: Mar. 16, 2007

(65) Prior Publication Data
US 2008/0148571 A1 Jun. 26, 2008

(30) Foreign Application Priority Data
Dec. 22, 2006 (CN) .......................... 2006 1 0157861

(51) Int. Cl.
*B21D 53/10* (2006.01)

(52) U.S. Cl. ....... 29/898.02; 29/898; 264/610; 264/635; 264/645; 264/656; 384/12; 384/120

(58) Field of Classification Search ............ 29/898, 29/898.02, 890.042, 890.043, 890.052; 264/610, 264/635, 636, 637, 645, 656, 657, 670, 162, 264/296; 384/12, 120
See application file for complete search history.

(56) References Cited

U.S. PATENT DOCUMENTS

| | | | | |
|---|---|---|---|---|
| 5,752,318 | A  * | 5/1998 | Fannar | 29/898.02 |
| 6,012,845 | A  * | 1/2000 | Lyon | 384/12 |
| 6,698,097 | B1 * | 3/2004 | Miura et al. | 29/898.02 |
| 6,905,617 | B2 * | 6/2005 | Chang et al. | 216/8 |
| 7,146,733 | B2 * | 12/2006 | Yamashita et al. | 29/898.02 |
| 7,431,505 | B2 * | 10/2008 | Shibahara et al. | 384/100 |
| 2006/0002640 | A1 | 1/2006 | Chen et al. | |

FOREIGN PATENT DOCUMENTS

| | | |
|---|---|---|
| JP | 10306827 | 11/1998 |
| WO | 2006123602 A1 | 11/2006 |

* cited by examiner

*Primary Examiner* — Rick K Chang
(74) *Attorney, Agent, or Firm* — Jeffrey T. Knapp

(57) ABSTRACT

A method for manufacturing a hydrodynamic bearing (30) comprises steps of: step (201): providing a substrate (10) with a plurality of protrusions (14) formed on a periphery thereof; step (202): placing the substrate in a middle of a hollow mold, then injecting a feedstock of powder and molten binder into the mold to surround the substrate under pressure, thus forming a desired bearing preform (20); step (203): separating the substrate from the bearing preform by means of catalytic debinding; step (204): separating the binder from the bearing preform; step (205): sintering the bearing preform; step (206): precision machining the bearing preform to form the desired hydrodynamic bearing.

13 Claims, 5 Drawing Sheets

METHOD FOR MANUFACTURING HYDRODYNAMIC BEARING AND SHAFT

CROSS-REFERENCE TO RELATED APPLICATIONS

This application is related to U.S. patent application Ser. No. 11/627,566 filed on Jan. 26, 2007 and entitled "METHOD FOR MANUFACTURING HYDRODYNAMIC BEARING AND SHAFT"; the co-pending U.S. patent application is assigned to the same assignee as the instant application. The disclosure of the above-identified application is incorporated herein by reference.

BACKGROUND OF THE INVENTION

1. Field of the Invention

The present invention relates generally to a bearing and a shaft, and more particularly to a method of manufacturing a bearing or a shaft with hydrodynamic pressure generating grooves.

2. Description of Related Art

At present, hydrodynamic bearings are widely used in spindle motors in devices, such as compact disc (CD) drivers, digital video disc (DVD) drivers, hard disk drivers, laser beam printers, floppy disk drivers or in heat-dissipation fans. The spindle motors require a hydrodynamic bearing of small size, high rotational accuracy and long life.

A typical hydrodynamic bearing defines a bearing hole therein. A shaft is rotatably received in the bearing hole. A plurality of herringbone-shaped grooves are defined either in an inner circumferential surface of the bearing or in an external circumferential surface of the shaft. The grooves can accommodate lubricant, such as oil. During rotation of the shaft, the lubricant is driven by the rotating shaft. A lubricating film is thus formed in a clearance between the external circumferential surface of the shaft and the inner circumferential surface of the bearing. Accordingly, the shaft is supported by hydrodynamic shearing stress and dynamic pressure generated by the lubricating film when the lubricant flows through different cross-sections. The hydrodynamic bearing has low abrasion as well as long life and low extent of noise because of no radial contact between the shaft and the bearing under hydrodynamic action.

A related method for manufacturing a hydrodynamic bearing 50 showed in FIG. 5 comprises following processes of: (a1) manufacturing a bearing 52 with a bearing hole 54 therein; and (a2) defining a plurality of hydrodynamic pressure generating grooves 56 in a bearing surface 55 of the bearing 52 by chemical etching, electrolysis electric discharge or machining. However, the small size of the hydrodynamic bearing 50 results in difficulties particularly in the making of the grooves 56 in the bearing surface 55 of the bearing 52. This makes manufacturing of the hydrodynamic bearing 50 both time-consuming and expensive. Therefore, the related method is not suitable for mass-production of the hydrodynamic bearing 50.

US No. 2006/0002640 A1 discloses a method for manufacturing a composite hydrodynamic bearing. The composite bearing is formed by combining a plurality of bearing blocks. Because the bearing blocks are manufactured separately, the composite bearing cannot obtain an accurate size and concentricity.

It is therefore desirable to provide an improved method for mass-production of a hydrodynamic bearing with accurate size and concentricity.

SUMMARY OF THE INVENTION

A method for manufacturing a hydrodynamic bearing comprises steps of: 1. providing a substrate with a plurality of protrusions formed on a periphery thereof; 2. placing the substrate in a middle of a hollow mold, then injecting a feedstock of powder and molten binder into the mold to surround the substrate under pressure, thus forming a desired bearing preform; 3. separating the substrate from the bearing preform by means of catalytic debinding; 4. separating the binder from the bearing preform; 5. sintering the bearing preform; 6. precision machining the bearing preform to form the desired hydrodynamic bearing.

Other advantages and novel features of the present invention will become more apparent from the following detailed description of preferred embodiment when taken in conjunction with the accompanying drawings.

BRIEF DESCRIPTION OF THE DRAWINGS

Many aspects of the present driving device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
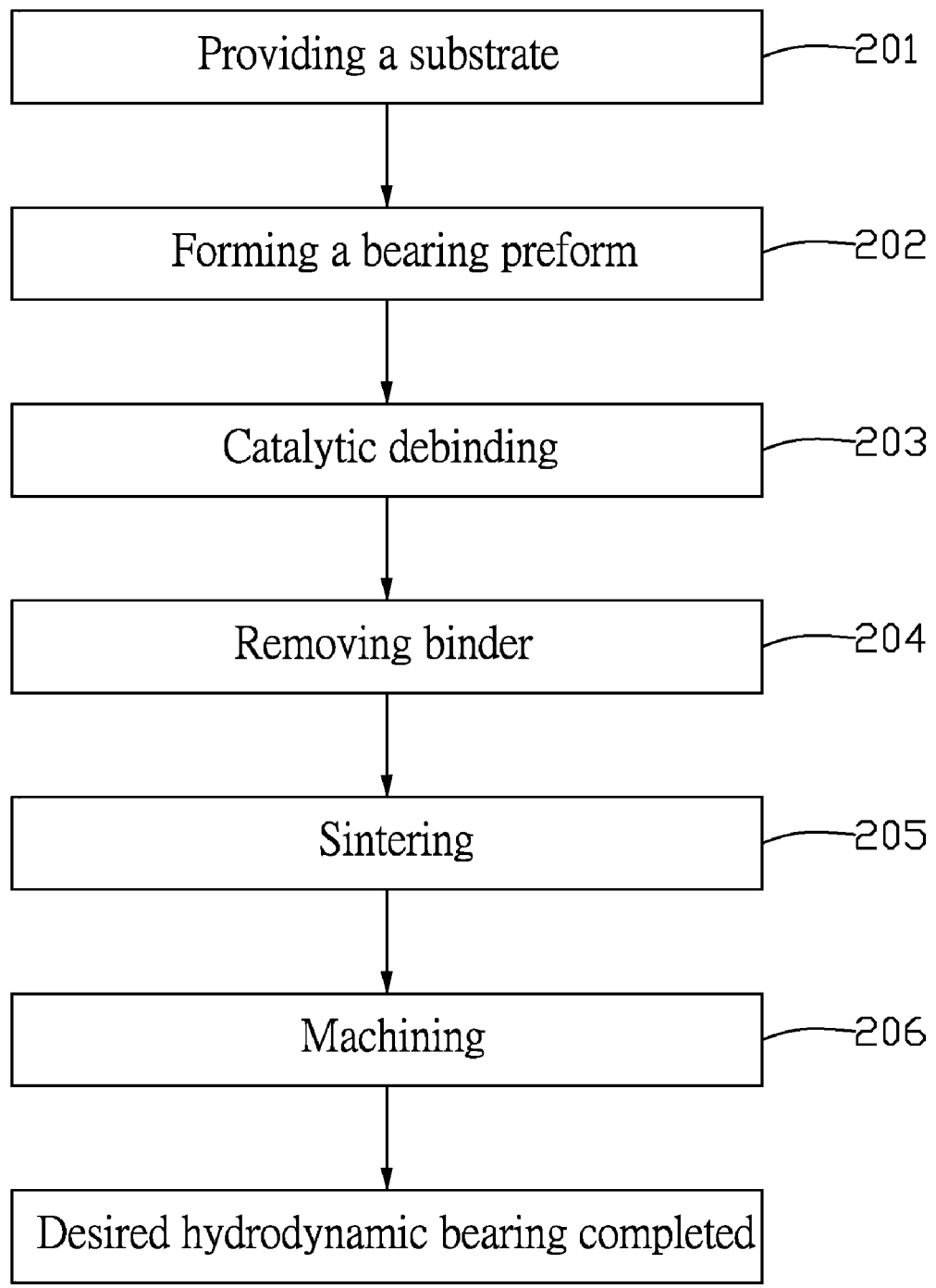
FIG. 1 is a flow chart of a method employed in manufacturing a hydrodynamic bearing in accordance with a preferred embodiment of the present invention.
Figure 2:
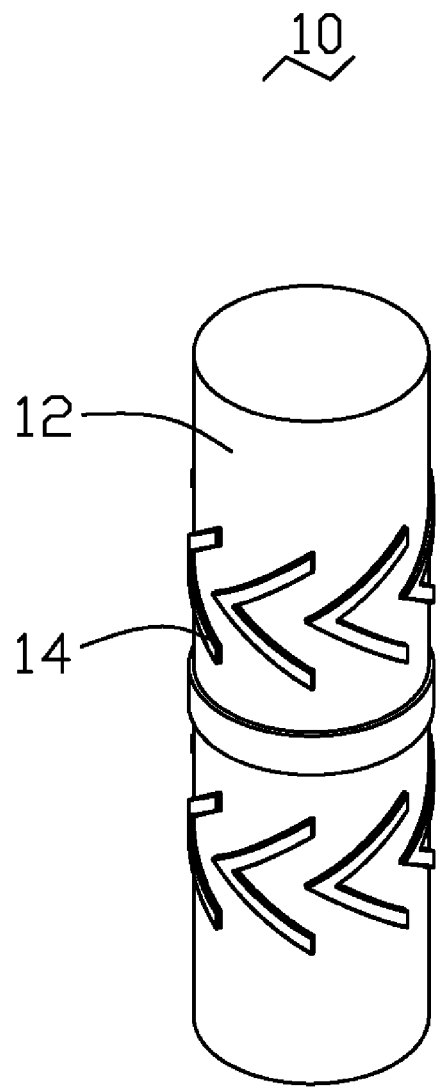
FIG. 2 is an isometric view of a substrate formed by the method in FIG. 1.
Figure 3:
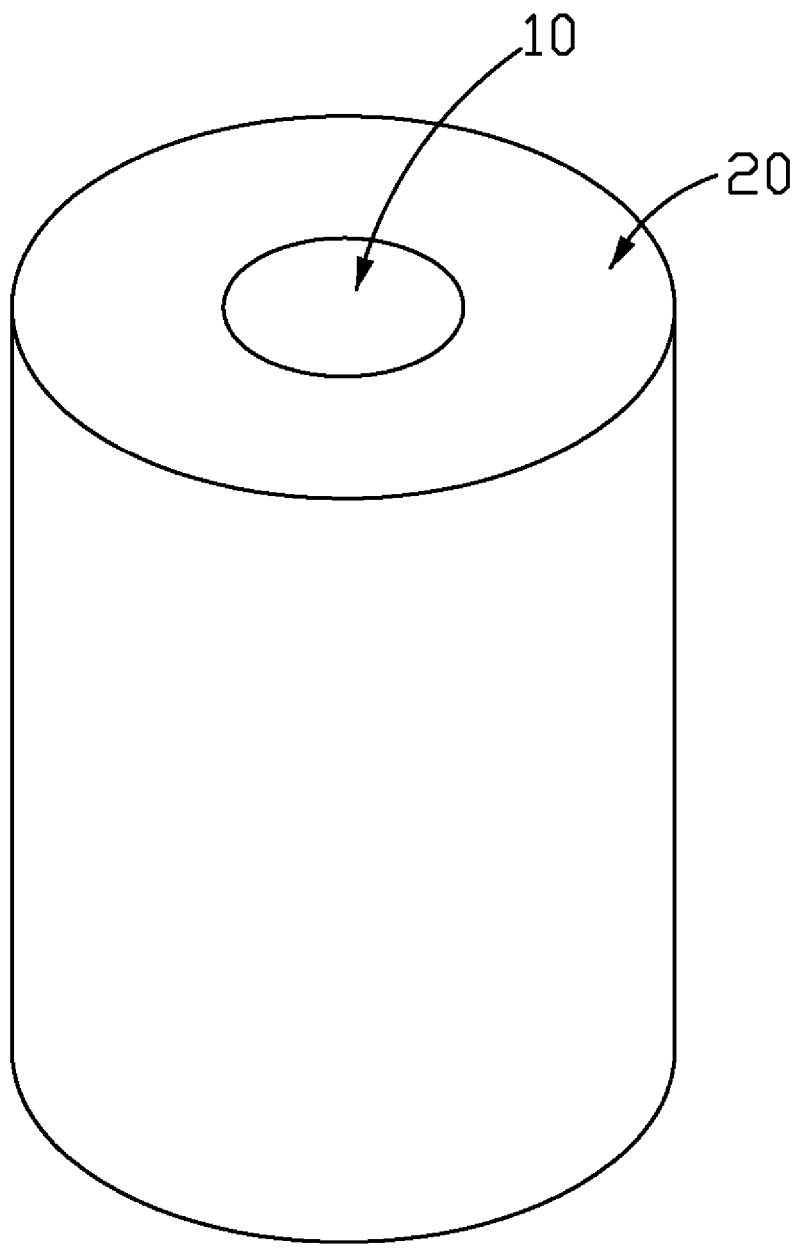
FIG. 3 is an isometric view of the substrate of FIG. 2 surrounded by a bearing preform.
Figure 4:
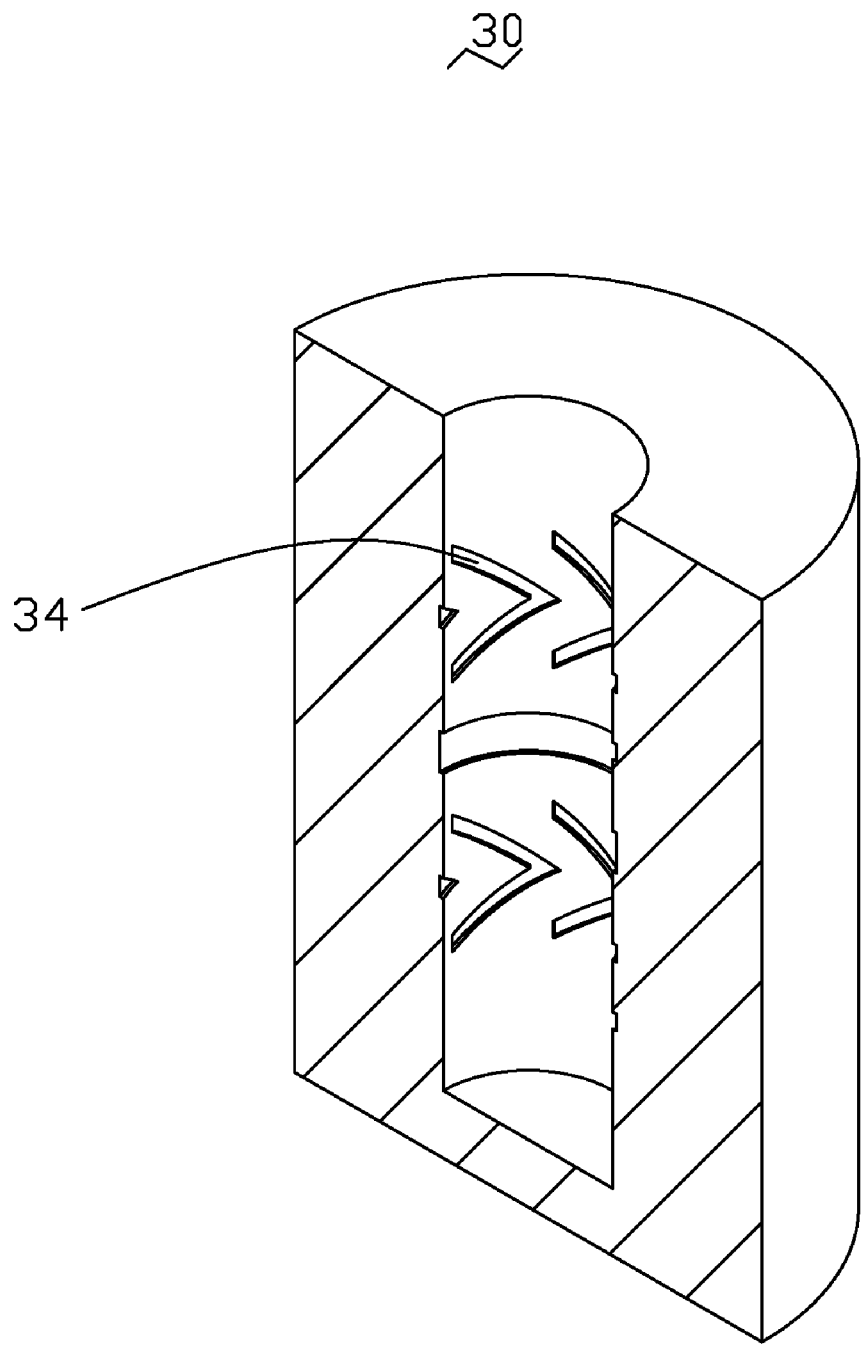
FIG. 4 is a cross-sectional, isometric view of a hydrodynamic bearing obtained by the method of FIG. 1.
Figure 5:
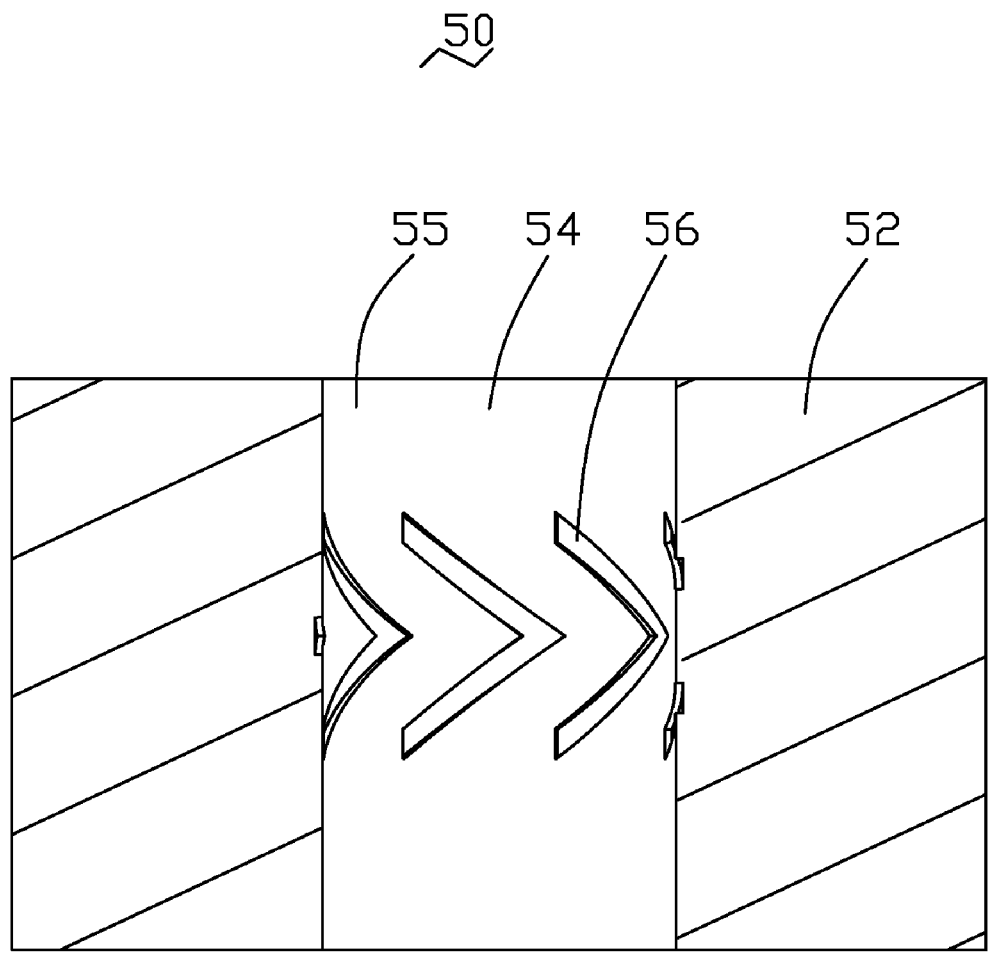
FIG. 5 is a cross-sectional view of a related hydrodynamic bearing.

Referring to FIG. 4, a hydrodynamic bearing 30 in accordance with a preferred embodiment of the present invention is shown. The hydrodynamic bearing 30 has a plurality of herringbone-shaped grooves 34 with low levels of lubricant leakage that can provide good hydrodynamic action. The herringbone-shaped grooves 34 can be used as hydrodynamic pressure generating grooves to provide good hydrodynamic action. A method for manufacturing the hydrodynamic bearing 30 in accordance with the present invention, as shown in FIG. 1 to FIG. 3, comprises steps of:

step 201: providing a substrate 10 with a plurality of protrusions 14 formed on a periphery thereof;

step 202: placing the substrate 10 in a middle of a hollow mold, then injecting a feedstock of powder and molten binder into the mold to surround the substrate 10 under a pressure, thus forming a desired bearing preform 20;

step 203: separating the substrate 10 from the bearing preform 20 by means of catalytic debinding;

step 204: separating the binder from the bearing preform 20;

step 205: sintering the bearing preform 20;

step 206: performing a precision machining to the bearing preform 20, thereby forming the desired hydrodynamic bearing 30.

External periphery of the substrate 10 corresponds to an inner surface of the desired hydrodynamic bearing 30. The substrate 10 comprises a cylindrical body 12 and a plurality of herringbone-shaped protrusions 14 formed on a circumferential surface of the body 12. The body 12 is used for forming a bearing hole of the hydrodynamic bearing 30 and the protrusions 14 are used to form the herringbone-shaped grooves 34 of the hydrodynamic bearing 30 which can generate hydrodynamic pressure. The protrusions 14 are spaced from each other and distributed regularly in two rows.

Step 201 is described in detail as follows: a material for forming the substrate 10 should meet requirements for steps 202 and 203. In step 202, a melting point of the material for forming the substrate 10 is required to be higher than that of the molten binder of the feedstock to prevent the substrate 10 from becoming deformed when the substrate 10 contacts with the feedstock. On the other hand, in step 203, the material for forming the substrate 10 should be able to be easily separated from the hydrodynamic bearing preform 20 by means of debinding. For example, polyoxymethylene (POM) can be used as a material for the substrate 10. POM has many advantages such as excellent mechanical properties (i.e. rigidity, impact resistant, low abrasion, creep resistance), outstanding chemical properties (i.e. hydrolytic stability fatigue endurance and solvent resistance) and good thermal stability. The substrate 10 composed of POM can be made by means of injection molding, extrusion molding, blow molding, rotational molding, soldering, adhering, coating, plating, machining and so on. Injection molding can be used for making the desired substrate 10 and includes steps of: (c1) melting the material for forming the substrate 10; (c2) injecting the molten material into a mold (not shown) to form the substrate 10; (c3) cooling the mold and taking the substrate 10 out of the mold. Injection molding can be performed in a normal injection machine. The material for forming the substrate 10 further comprises dispersant, surfactant and additive.

Step 202 is described in detail as follows: the hydrodynamic bearing preform 20 can be formed by metal injection molding (MIM) when the substrate 10 is mainly composed of POM. The feedstock generally comprises metal powder or ceramic powder. The binder of the feedstock is required to be a material with a lower melting point than that of the substrate 10 and be easily removable by debinding or extraction, such as polyethylene (PE). MIM includes the following processes: (d1) mixing the powder and the binder to form the feedstock under a high temperature; (d2) pushing the feedstock to form a desired shape such as the hydrodynamic bearing preform 20 in a mold under a pressure. The injection machine used in step 201 for forming the substrate 10 can be used to manufacture the hydrodynamic bearing preform 20 in step 202. MIM used for manufacturing the hydrodynamic bearing preform 20 has many advantages such as high shape complexity, low cost, tight tolerances, high density, high performance etc.

Step 203 is described in detail as follows: the debinding methods available include thermal cracking debinding and catalytic debinding. Catalytic debinding is used to separate the substrate 10 from the hydrodynamic bearing preform 20 in accordance with a preferred embodiment of the present invention. Catalytic debinding comprises following processes: (e1) placing the hydrodynamic bearing preform 20 made by step 202 in a middle of a furnace for debinding; (e2) Inputting nitric acid ($HNO_3$) gas as a catalyst into the furnace at a temperature in an approximate range of between 110° C. and 140° C. that is lower than a melting point of the hydrodynamic bearing preform 20. POM reacts with $HNO_3$ and decomposes to form gaseous formaldehyde in the acid and thermal atmosphere so that the substrate 10 could be quickly removed from the hydrodynamic bearing preform 20. Thus the rate of debinding is increased and the hydrodynamic bearing preform 20 is given good shape retention by means of catalytic debinding. However, when in the thermal cracking debinding process, the hydrodynamic bearing preform 20 is inclined to break during the thermal cracking debinding process because of the difference between coefficient of expansion of the substrate 10 and that of the hydrodynamic bearing preform 20. Accordingly, catalytic cracking debinding is preferred to thermal cracking debinding in the present invention. In spite of this, thermal cracking debinding still can be used to achieve the debinding of the substrate 10 if the heating process thereof is precisely controlled. Furthermore, the gaseous formaldehyde produced during the catalytic debinding process is transferred to another part of the furnace to burn into carbon dioxide ($CO_2$) and nitrogen dioxide ($NO_2$), which are not toxic. As a result, the bearing 30 has accurate size and concentricity.

Step 204 is described in detail as follows: after the substrate 10 is separated from the bearing preform 20, the binder can been separated from the bearing preform 20 by means of thermal debinding or extraction.

Step 205 is described in detail as follows: after the binder is separated from the bearing preform 20, the bearing preform 20 consequently is weakened. Therefore, it is necessary to sinter the bearing preform 20 in place. The sintering process can be performed in a vacuum, or in an oxygen and/or nitrogen atmosphere.

Step 206 is described in detail as follows: generally, the hydrodynamic bearing preform 20 is inclined to deform during sintering processes. In order to make a hydrodynamic bearing preform 20 having a high level of precision in its manufacture, it is necessary to perform a machining operation on the bearing preform 20 using methods such as broaching, grinding, milling, polishing, and so on.

Furthermore, the method in accordance with the preferred embodiment of the present invention can be used for manufacturing other kinds of hydrodynamic bearings or shaft with different shapes of grooves. When applying the method to make a desired shaft with hydrodynamic pressure generating grooves formed in a circumferential surface thereof, a substrate with a central hole defined therein should be provided. An internal surface of the substrate is required to correspond in shape to the circumferential surface of the desired shaft.

Compared with the related method for manufacturing the hydrodynamic bearing 50, the hydrodynamic bearing 30 is configured (i.e., structured and arranged) for mass-production by the method in accordance with the preferred embodiment of the present invention. Also, the hydrodynamic bearing 30 manufactured by the present method has accurate size and concentricity.

It is to be understood that the above-described methods are intended to illustrate rather than limit the invention. Variations may be made to the methods without departing from the spirit of the invention. Accordingly, it is appropriate that the appended claims be construed broadly and in a manner consistent with the scope of the invention.

What is claimed is:

1. A method for manufacturing a hydrodynamic bearing with hydrodynamic pressure generating grooves, comprising:

providing a substrate with a plurality of protrusions formed on a periphery thereof;

placing the substrate in a middle of a hollow mold, then injecting a feedstock of powder and molten binder into the mold to surround the substrate under pressure, thus forming a desired bearing preform;

separating the substrate from the bearing preform by means of catalytic debinding;

separating the molten binder from the bearing preform; and sintering the bearing preform;

wherein in the catalytic debinding, nitric acid ($HNO_3$) gas is used as a catalyst; and wherein gaseous formaldehyde produced during the catalytic debinding is transferred and burned into carbon dioxide ($CO_2$) and nitrogen dioxide ($NO_2$).

2. The method as claimed in claim 1, wherein polyoxymethylene (POM) is used as a material of the substrate.

3. The method as claimed in claim 2, wherein the substrate is made of a method chosen from a group consisting of injection molding, extrusion molding, blow molding, rotational molding, soldering, adhering, coating, plating and machining.

4. The method as claimed in claim 1, wherein in the catalytic debinding, a temperature in a furnace for debinding is maintained in an approximate range of from 110° C. to 140° C.

5. The method as claimed in claim 1, wherein polyethylene (PE) is provided as a material of the binder of the feedstock.

6. The method as claimed in claim 5, wherein the binder of the feedstock is removed by debinding or extraction.

7. The method as claimed in claim 1, wherein a precision machining operation is performed to the bearing preform after the sintering to thereby form the hydrodynamic bearing.

8. A method for manufacturing a shaft with a plurality of hydrodynamic pressure generating grooves, comprising:

providing a substrate with a central hole defined therein, an internal surface of the substrate corresponding to a circumferential surface of the shaft;

placing the substrate in a middle of a mold, then injecting a feedstock of powder and molten binder into the central hole of the substrate under pressure, thus forming a shaft preform;

separating the substrate from the shaft preform by means of catalytic debinding;

separating the molten binder from the shaft preform;

sintering the shaft preform; and performing precision machining on the shaft preform to thereby form the shaft;

wherein in the catalytic debinding, nitric acid ($HNO_3$) gas is used as a catalyst; and wherein gaseous formaldehyde produced during the catalytic debinding process is transferred and burned into carbon dioxide ($CO_2$) and nitrogen dioxide ($NO_2$).

9. The method as claimed in claim 8, wherein polyoxymethylene (POM) is provided as a material of the substrate.

10. The method as claimed in claim 9, wherein the substrate is made of a method chosen from the group of consisting of injection molding, extrusion molding, blow molding, rotational molding, soldering, adhering, coating, plating and machining.

11. The method as claimed in claim 8, wherein in the catalytic debinding, a temperature in a furnace for debinding is maintained in an approximate range of from 110° C. to 140° C.

12. The method as claimed in claim 8, wherein polyethylene (PE) is used as a material of the binder of the feedstock.

13. The method as claimed in claim 12, wherein the binder of the feedstock is removed by debinding or extraction.

* * * * *